United States Patent
Kikuchi et al.

(10) Patent No.: US 8,621,378 B2
(45) Date of Patent: Dec. 31, 2013

(54) MOBILE TERMINAL DEVICE AND DISPLAY CONTROL METHOD

(75) Inventors: Taro Kikuchi, Kawasaki (JP); Daiki Fukushima, Kawasaki (JP); Junya Yamaguchi, Kawasaki (JP); Nao Horiguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 163 days.

(21) Appl. No.: 12/566,125

(22) Filed: Sep. 24, 2009

(65) Prior Publication Data

US 2010/0083167 A1    Apr. 1, 2010

(30) Foreign Application Priority Data

Sep. 29, 2008  (JP) ................. 2008-249861

(51) Int. Cl.
- *G06F 3/048* (2013.01)
- *G06F 3/033* (2013.01)
- *G09G 5/00* (2006.01)
- *H04M 1/00* (2006.01)

(52) U.S. Cl.
USPC ........... 715/773; 715/772; 715/863; 345/156; 455/575.4

(58) Field of Classification Search
USPC .......................... 715/773, 863, 859, 786, 772; 361/679.06; 455/575.3, 575.4
See application file for complete search history.

(56) References Cited

U.S. PATENT DOCUMENTS

| | | | | |
|---|---|---|---|---|
| 5,903,229 A | * | 5/1999 | Kishi ................. | 341/20 |
| 7,199,786 B2 | * | 4/2007 | Suraqui ................ | 345/168 |
| 7,319,454 B2 | * | 1/2008 | Thacker et al. ........... | 345/163 |
| 7,614,008 B2 | * | 11/2009 | Ording .................. | 715/773 |
| 7,705,903 B2 | * | 4/2010 | Kawasaki et al. ........ | 348/333.01 |
| 7,860,536 B2 | * | 12/2010 | Jobs et al. .............. | 455/566 |
| 7,877,705 B2 | * | 1/2011 | Chambers et al. ........... | 715/835 |
| 7,983,723 B2 | * | 7/2011 | Dunko .................. | 455/575.4 |
| 8,160,650 B2 | * | 4/2012 | Kim et al. .............. | 455/566 |
| 2002/0137551 A1 | * | 9/2002 | Toba ..................... | 455/566 |
| 2004/0113956 A1 | * | 6/2004 | Bellwood et al. ........... | 345/863 |
| 2005/0134578 A1 | * | 6/2005 | Chambers et al. ........... | 345/184 |
| 2006/0026535 A1 | * | 2/2006 | Hotelling et al. ........... | 715/863 |
| 2006/0287015 A1 | * | 12/2006 | Dunko .................. | 455/575.4 |
| 2007/0094417 A1 | | 4/2007 | Hur et al. | |
| 2007/0236475 A1 | * | 10/2007 | Wherry .................. | 345/173 |
| 2008/0062141 A1 | * | 3/2008 | Chandhri ............... | 345/173 |
| 2008/0225014 A1 | * | 9/2008 | Kim ..................... | 345/173 |

(Continued)

FOREIGN PATENT DOCUMENTS

| | | |
|---|---|---|
| JP | 2002-222034 | 8/2002 |
| JP | 2004-012919 | 1/2004 |
| JP | 2006-323820 | 11/2006 |
| JP | 2007-292834 | 11/2007 |

OTHER PUBLICATIONS

"Japanese Office Action" mailed by JPO and corresponding to Japanese Application No. 2008-249861 on Jun. 19, 2012, with partial English translation.

*Primary Examiner* — Nicholas Ulrich
(74) *Attorney, Agent, or Firm* — Fujitsu Patent Center

(57) ABSTRACT

A mobile terminal device, method, and program that displays, on a display unit, an image indicating an operation unit corresponding to a physical operation unit and used to navigate in place of the physical operation unit, detects a touch operation performed on the display unit, and changes the image indicating the operation unit according to a trajectory of the touch operation.

5 Claims, 13 Drawing Sheets

(56) References Cited

U.S. PATENT DOCUMENTS

| | | |
|---|---|---|
| 2009/0017872 A1* | 1/2009 | Myers et al. .................. 455/566 |
| 2009/0024314 A1* | 1/2009 | Kim ............................. 701/200 |
| 2009/0058823 A1* | 3/2009 | Kocienda ..................... 345/173 |
| 2009/0088217 A1* | 4/2009 | Chung et al. .................. 455/566 |
| 2009/0153470 A1* | 6/2009 | Chen et al. .................... 345/156 |
| 2009/0156273 A1* | 6/2009 | Romesburg et al. ........ 455/575.3 |
| 2009/0251422 A1* | 10/2009 | Wu et al. ....................... 345/173 |

* cited by examiner

MOBILE TERMINAL DEVICE AND DISPLAY CONTROL METHOD

CROSS-REFERENCE TO RELATED APPLICATIONS

This application is based upon and claims the benefit of priority of the prior Japanese Patent Application No. 2008-249861, filed on Sep. 29, 2008, the entire contents of which are incorporated herein by reference.

FIELD

The present invention relates to a mobile terminal device and a display control method.

BACKGROUND

In recent years, multiple functions of a mobile terminal device, such as a mobile phone, have been improved. A user may perform various operations while looking at a screen of a display device mounted on a mobile terminal device. There may be various input devices by which the user performs operations. For example, there is a mobile terminal mounting a scroll wheel to display a menu according to a scrolling operation of the scroll wheel (see, for example, Japanese Laid-open Patent Publication No. 2006-323820).

Furthermore, a touch panel may be used as a unit for operations performed by the user. For example, there is an on-vehicle information display device in which an image of a scroll dial is displayed on a monitor with a touch panel. When an edge part of the image of the scroll dial is touched, the on-vehicle information display device scrolls the menu displayed on the monitor (see, for example, Japanese Laid-open Patent Publication No. 2004-12919). Furthermore, there is a navigation device that displays a map and a trackball on a display screen with a touch panel. This navigation device scrolls the map according to a rubbing operation of the trackball on a displayed area (see, for example, Japanese Laid-open Patent Publication No. 2007-292834).

The techniques described in Japanese Laid-open Patent Publication No. 2004-12919 and Japanese Laid-open Patent Publication No. 2007-292834 enable the user to scroll the screen by touching an area in which an image for operations, such as an image of a scroll dial or a trackball, is displayed. However, since the image for operations is small and displayed at the edge of the display device, operability of a touch operation is low. This is a big problem specifically for a device, such as a mobile terminal device, in which the display area may not be large.

SUMMARY

According to an aspect of the invention, a mobile terminal device includes a display unit that includes a display area in which an image indicating an operation unit is displayed, a detecting unit that detects a touch operation performed on the display unit, and a control unit that changes the image indicating the operation unit displayed on the display unit according to a trajectory of the touch operation detected by the detecting unit.

According to another aspect of the invention, a method for a mobile device includes displaying an image indicating an operation unit in a display area of a display unit, detecting a touch operation performed on the display unit, and changing the image indicating the operation unit according to a trajectory of the detected touch operation.

According to another aspect of the invention, a program for a mobile device that displays an image indicating an operation unit in a display area of a display unit, detects a touch operation performed on the display unit, and changes the image indicating the operation unit according to a trajectory of the detected touch operation.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF THE EMBODIMENTS

Figure 1:
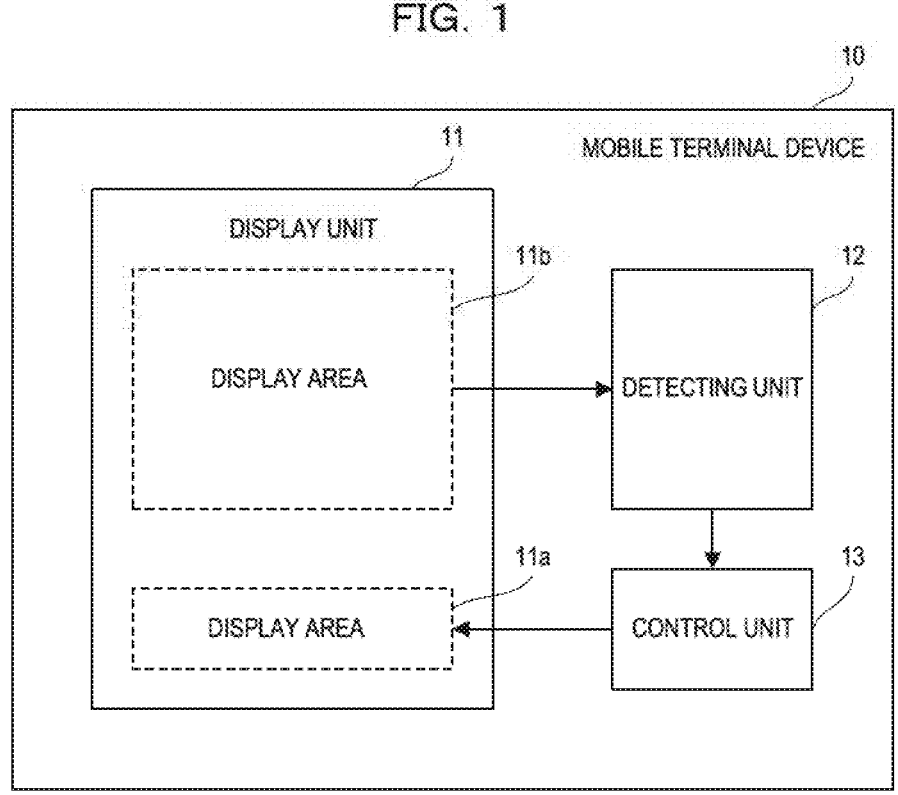
FIG. 1 is a diagram illustrating a mobile terminal device according to an embodiment.

A detailed description of the present invention will be made below with respect to the diagrams. FIG. 1 is a diagram illustrating a mobile terminal device according to the present embodiment. A mobile terminal device 10 illustrated in FIG. 1 includes a display unit 11, a detecting unit 12, and a control unit 13.

The display unit 11 includes a display area 11a (a first display area) and a display area 11b (a second display area) that is outside the display area 11a. As the display unit 11, a liquid crystal display or an organic Electro Luminescence (EL) display may be used, for example. The display unit 11 displays an image indicating an operation unit in the display area 11a. As the image indicating the operation unit, an image indicating a shape of an input device may be used. For example, an image of a scroll wheel, an image of a cross key, a slider bar, or the like may be used. Furthermore, the display unit 11 may display various images in the display area 11b. The display unit 11 may display, for example, contents such as a text, a static image, a moving image, and/or a menu used to call up various functions.

The detecting unit 12 detects a user's touch operation performed on the display unit 11. As the detecting unit 12, a touch panel may be used, for example. The detecting unit 12 notifies the control unit 13 of a touched position of the display unit 11. Notification of the touched position may be performed regularly (for example, every 50 milliseconds). Furthermore, the detecting unit 12 may notify the control unit 13 of information to distinguish between a momentary contact operation (click) and a continuous rubbing operation (drag). The detecting unit 12 may detect the touch operation performed on either or both the display area 11a and/or the display area 11b. The detecting unit 12 may detect a drag extending over the display area 11a and the display area 11b.

According to a trajectory of the touch operation, performed on the display unit 11, detected by the detecting unit 12, the control unit 13 changes the image indicating the operation unit displayed in the display area 11a. For example, the control unit 13 displays, in the display area 11a, an image indicating that the scroll wheel is rotated, an image indicating that any direction of the cross key is pressed, an image indicating that the slide bar is slid, or the like. At this time, the control unit 13 may change the image indicating the operation unit according to a drag direction or a drag distance of the touch operation. For example, the image of the scroll wheel is rotated clockwise or counterclockwise according to the drag direction.

The display unit 11 may display the image indicating the operation unit in the display area 11 if only a specified condition is satisfied. When the display unit 11 does not display the image indicating the operation unit, the display area 11a may be used for another purpose such as displaying contents or a menu. Moreover, the display unit 11 may display nothing in the display area 11a.

According to the above-displayed mobile terminal device 10, the image indicating the operation unit is displayed in the display area 11a of the display unit 11. The detecting unit 12 detects the touch operation performed on the display unit 11 (for example, the touch operation performed on the display area 11b that is different from the display area 11a). According to the trajectory of the detected touch operation, the control unit 13 changes the image indicating the operation unit displayed in the display area 11a.

Accordingly, the operability of the touch operation is improved. For example, even if the touch operation is performed in an area (e.g., the display area 11b) other than the area in which the image indicating the operation unit is displayed (the display area 11a), the mobile terminal device 10 may recognize this operation as a touch operation for a menu operation. A user may recognize that the touch operation is normally recognized when the image indicating the operation unit displayed in the display area 11a changes. As a result, burden of a user's touch operation may be reduced, and user operation errors may be reduced.

Next, a detailed description will be made of a case where the above-described display control is applied to a mobile phone. In particular, a sliding mobile phone will be given as an example. A housing having a display unit is slidable in relation to a housing having an operation unit such as a numeric keypad or the like. However, the above-described display control is applicable to other types of mobile phones such as a folding type mobile phone or a straight type mobile phone. The above-described display control is also applicable to an information processing device other than a mobile phone.

First Embodiment

Figure 2:
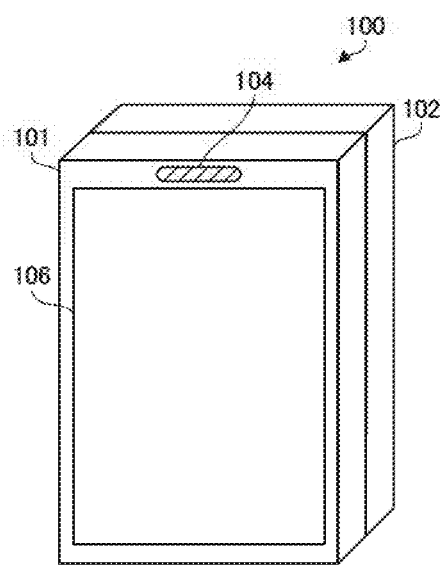
FIG. 2 is a diagram illustrating a first state of a mobile phone.

FIG. 2 is a diagram illustrating a first state of a mobile phone. A mobile phone 100 includes a housing 101 and a housing 102. The housing 101 may be slid in relation to the housing 102 in upward and downward directions. FIG. 2 illustrates a state where the housing 101 and the housing 102 are overlapped and the front surface of the housing 102 is covered by the housing 101. The housing 101 includes a speaker 104, a touch panel 106, and a display 107 (not illustrated in FIG. 2).

The speaker 104 reproduces a sound by converting an electronic signal into a physical vibration. For example, when the user of the mobile phone 100 is having a conversation, the voice of the conversation partner and background noise from the conversation partner side are output from the speaker 104.

The touch panel 106 detects a touch operation. The user may touch the touch panel 106 with a finger. The user also may touch the touch panel 106 using a pointing device such as a touch pen. When the touch operation is performed on the touch panel 106, a position where the finger, the touch pen, or the like is touched is detected.

The display 107 displays various images. The display 107 is positioned in a lower layer of the touch panel 106. The image displayed by the display 107 is visible from the front surface of the housing 101 through the touch panel 106. The user may perform the touch operation on the touch panel 106 while looking at the image displayed by the display 107.

Figure 3:
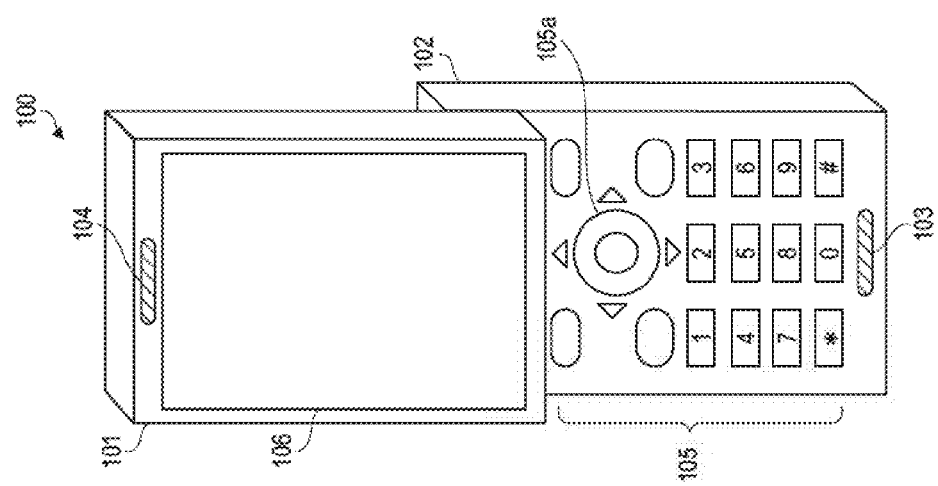
FIG. 3 is a diagram illustrating a second state of the mobile phone.

FIG. 3 is a diagram illustrating a second state of the mobile phone. The state illustrated in FIG. 3 is changed to the state illustrated in FIG. 2. That is, the housing 101 is slid in relation to the housing 102 in the upward direction. In this state, at least a part of the front surface of the housing 102 is exposed. The housing 102 includes a microphone (MIC) 103 and a keypad 105.

The MIC 103 accepts input of sound by converting the physical vibration of the sound into an electric signal. For example, when the user of the mobile phone 100 is having a conversation, the voice of the user and background noise from the user side are input from the MIC 103.

The keypad 105 includes various keys such as a numeric keypad and a functional key. When any of the keys is pressed, the keypad 105 detects and converts the press into an electric signal. By pressing a key, the user may transmit a telephone call, respond to an incoming call, input various character strings such as a telephone number, and the like.

The keypad 105 further includes a scroll wheel 105a. If the edge of the scroll wheel 105a is pressed, the scroll wheel 105a determines the pressed direction. For example, the direction may be detected by upward and downward, and left and right four directions. Moreover, the direction may be detected by eight directions that include four more directions of upper right, lower right, lower left, and upper left. The scroll wheel 105a determines a rotation angle if a rubbing operation (a rotating operation) is performed as if an arc is drawn. The user may change a selected item on the display screen and may scroll the screen by an operation of pressing the edge of the scroll wheel 105a or the rotating operation.

Figure 4:
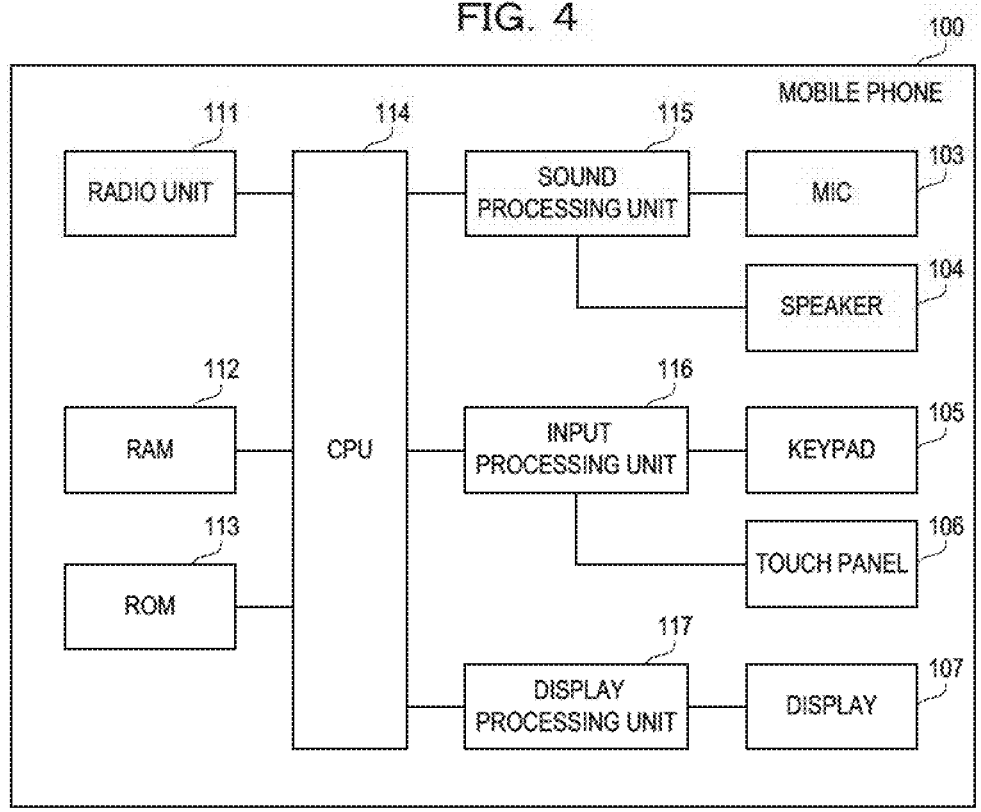
FIG. 4 is a block diagram illustrating hardware of the mobile phone.

FIG. 4 is a block diagram illustrating hardware of a mobile phone. The mobile phone 100 includes a radio unit 111, a Random Access Memory (RAM) 112, a Read Only Memory (ROM) 113, a Central Processing Unit (CPU) 114, a sound processing unit 115, an input processing unit 116, and a display processing unit 117.

The radio unit 111 performs radio signal processing to achieve radio communication with another communication device such as a base station. The radio unit 111 demodulates and decodes the signal received through an antenna mounted on the mobile phone 100, and outputs the obtained reception data to the CPU 114. Furthermore, the radio unit 111 encodes and modulates the transmission data obtained from the CPU 114 and outputs the obtained transmission signal through the antenna.

The RAM 112 is a memory that temporally stores data used for programs and processing to be executed by the CPU 114. At least a part of various programs and data are temporally stored in the RAM 112 by the CPU 114. The data stored in the RAM by the CPU 114 is properly updated. Instead of the RAM 112, other types of nonvolatile memories may be used.

The ROM 113 is a memory that stores the data used for programs and processing to be performed by the CPU 114. The ROM 113 stores, in advance, various programs for achieving a communications function and a display control function. Furthermore, the ROM 113 stores various data to be used with those programs. Instead of the ROM 113, other types of nonvolatile memories such as a flash memory may be used.

The CPU 114 controls operations of the whole mobile phone 100. The CPU 114 reads out the programs and data from the ROM 113 and executes the programs by using the RAM 112 when starting the mobile phone 100 and at a later stage. The CPU 114 performs various processing based on, for example, the reception data obtained from the radio unit 111, the sound data obtained from the sound processing unit 115, the input signal obtained from the input processing unit 116, and the like. As processing results, the CPU 114 generates the transmission data to be output to the radio unit 111, the sound data to be output to the sound processing unit 115, the image data to be output to the display processing unit 117, and the like.

The sound processing unit 115 performs sound signal processing. The sound processing unit 115 obtains a sound analog signal from the MIC 103, performs desired signal conversion processing, and outputs the sound data to the CPU 114. Furthermore, the sound processing unit 115 obtains the sound data from the CPU 114, performs the desired signal conversion processing, and allows the speaker 104 to reproduce the sound.

The input processing unit 116 processes an input operation performed by the user. If a key of the keypad 105 is pressed, the input processing unit 116 outputs an input signal indicating the pressed key to the CPU 114. If the touch operation is performed on the touch panel 106, the input processing unit 116 outputs, to the CPU 114, the input signal indicating that there is a contact (DOWN event), the contact is removed (UP event), coordinates of a current touch position, and the like. This means that a drag is being performed from the DOWN event to the UP event. While the drag is being performed, the coordinates of the current touch position are output regularly (for example, every 50 milliseconds). According to a touch state, the coordinates of the current touch position may be output irregularly.

The display processing unit 117 performs image display processing. The display processing unit 117 obtains image data from the CPU 114 and displays the image data on the display 107. The image to be displayed on the display 107 includes contents such as, for example, an image indicating a scroll wheel, a menu, a text, a static image, a moving image, and the like.

The display 107 corresponds to the display unit 11 illustrated in FIG. 1. The touch panel 106 corresponds to the detecting unit 12 illustrated in FIG. 1. The RAM 112, the ROM 113, and the CPU 114 correspond to the control unit 13 illustrated in FIG. 1.

Figure 5:
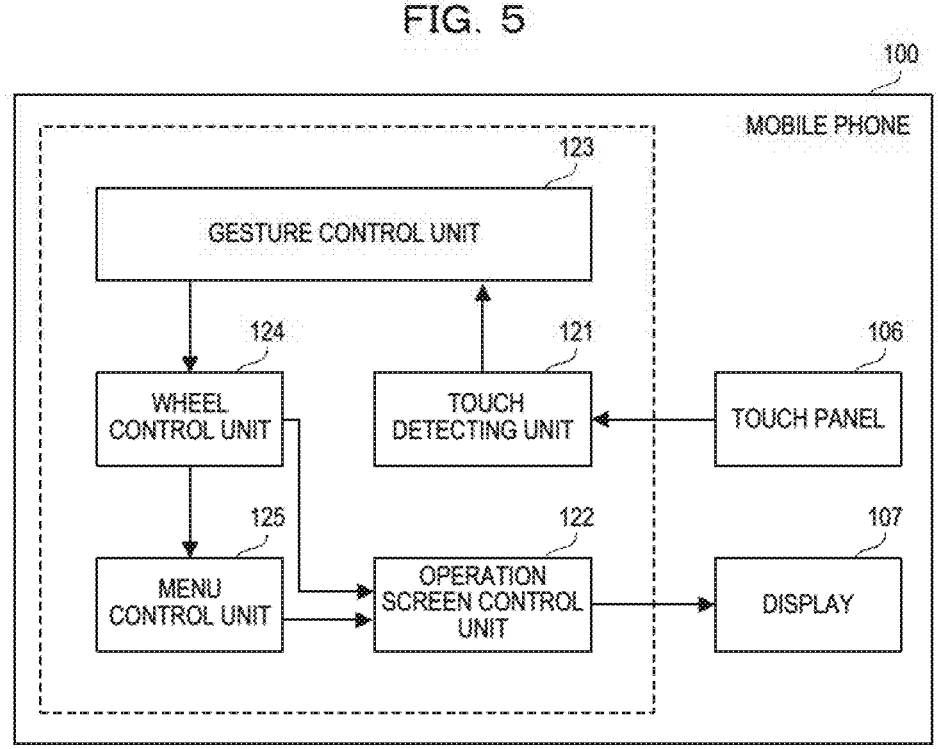
FIG. 5 is a block diagram illustrating functions of the mobile phone.

FIG. 5 is a block diagram illustrating functions of a mobile phone. The mobile phone 100 includes a touch detecting unit 121, an operation screen control unit 122, a gesture control unit 123, a wheel control unit 124, and a menu control unit 125. Those functions are achieved by allowing the programs stored in the ROM 113 to be executed by the CPU 114. All or a part of the functions may be achieved by hardware. As for the functions other than the display control (for example, a communication function), the description is omitted in FIG. 5.

The touch detecting unit 121 obtains information of the touch operation on the touch panel 106 via the input processing unit 116. The touch detecting unit 121 detects a dragging operation based on the UP event and the DOWN event obtained from the input processing unit 116. When the drag is being performed, the touch detecting unit 121 reports the coordinates of the current touch position to the gesture control unit 123 continuously (for example, every 50 ms, regularly).

The operation screen control unit 122 displays the image related to an operation of the display 107 via the display processing unit 117. Based on the instruction from the wheel control unit 124, the operation screen control unit 122 displays the image of the shape of the scroll wheel in a part of the display area (the first display area) of the display 107. The shape of the scroll wheel corresponds to the scroll wheel 105a of the housing 102. Based on the instruction from the menu control unit 125, the operation screen control unit 122 displays a menu in a display area (the second display area) different from the first display area of the display 107. For example, by selecting an item included in the menu, the user may call various functions included in the mobile phone 100.

The gesture control unit 123 continuously obtains the coordinates of the touch position from the touch detecting unit 121 while the drag is being performed on the touch panel 106. The gesture control unit 123 stores a specified number of nearest coordinates (for example, the nearest two coordinates). Based on the trajectory of the touch operation, the gesture control unit 123 replaces the input using the touch panel 106 with the input using the scroll wheel 105a.

Based on the latest coordinates and the stored previous coordinates obtained from the touch detecting unit 121, the gesture control unit 123 determines the rotation direction (clockwise or counterclockwise) of the circular arc drawn by the drag. Furthermore, the gesture control unit 123 calculates a distance (a drag amount) between the nearest point and the latest point and converts the drag amount into a rotation angle when using the scroll wheel 105a. Then the gesture control unit 123 notifies the wheel control unit 124 of the rotation direction and the rotation angle.

The wheel control unit 124 controls the image of the scroll wheel displayed on the display 107. When the wheel control unit 124 receives the notification of the rotation direction and the rotation angle from the gesture control unit 123, the wheel control unit 124 instructs the operation screen control unit 122 to display the image of the scroll wheel that is rotated in the rotation direction and by the rotation angle. Furthermore, the wheel control unit 124 notifies the menu control unit 125 of the rotation direction and the rotation angle.

The menu control unit 125 controls a menu displayed on the display 107. When the menu control unit 125 receives the notification of the rotation direction and the rotation angle from the wheel control unit 124, the menu control unit 125 changes the selected item according to the direction and the angle. For example, if the rotation direction is clockwise, the selected position is moved in an ascending order, and if the rotation direction is counterclockwise, the selected position is moved in a descending order. The selected position is moved at a speed according to the rotation angle. The menu control unit 125 instructs the operation screen control unit 122 to change the menu display.

In this case, even when the touch operation is performed in the display area (the first display area) different from the display area in which the image of the scroll wheel is displayed, the gesture control unit 123 replaces this touch operation with the rotating operation of the scroll wheel 105a. As a result, the image of the scroll wheel is rotated, and the current selected position in the menu is moved. This is the same as the case where the rotating operation is performed on the image of the scroll wheel. That is, instead of drawing a small circular arc on the image of the scroll wheel, the user may draw a large circular arc outside the area in which the image of the scroll wheel is displayed.

The calculation method for a rotation angle may be different for the rotating operation on the image of the scroll wheel and the rotating operation in other display areas, respectively. For example, the drag amount according to a specified angle may be set to be small for the case of the rotating operation on the image of the scroll wheel and may be set to be large for the case of the rotating operation in other display areas. Furthermore, a drag extending over the first display area and the second display area may be detected. For example, if the start point of drag is inside the first display area, the rotating operation may be recognized as a touch operation performed on the image of the scroll wheel even though the drag extends over the second display area. Meanwhile, if the start point of drag is inside of the second display area, the rotating operation may be recognized as a touch operation performed in the area in which the image of the scroll wheel is not displayed even though the drag extends over the first display area.

Only if a specified condition is satisfied (or the specified condition is not satisfied), the rotating operation performed in the display area other than the area in which the image of the scroll wheel is displayed may be responsive. For example, the rotating operation is responsive only when the menu is displayed on the display 107 and is not responsive when an image other than the menu is displayed. When an image other than the menu is displayed, the rotating operation may be recognized as a touch operation on the image.

Figure 6:
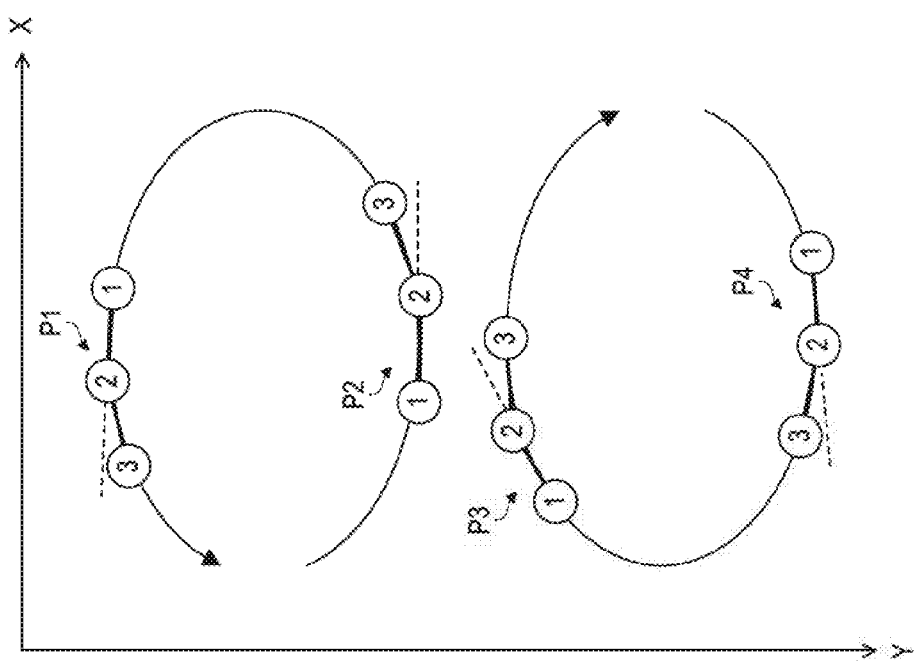
FIG. 6 is a diagram illustrating a detecting method of a rotation direction of a dragging operation.

FIG. 6 is a diagram illustrating a detecting method of a rotation direction of a dragging operation. In this case, the upper left position of the touch panel 106 is an origin (0, 0), and the right direction from the origin is the positive direction of the X-axis, and the downward direction from the original point is the positive direction of the Y-axis. However, the original point may be changed to an arbitrary point. FIG. 6 illustrates an example in which the rotation direction is determined by using three points; the current point and the nearest two points. Four or more points may be used to determine the rotation direction.

As a method for determining the rotation direction, the gesture control unit 123 may determine the rotation direction based on the fact that the position relation of the three points corresponds to any one of the four patterns, P1 to P4. The determination is performed based on whether the first point (two points before) is on the right side or the left side of the second point (the previous point), and whether the third point is above or below the straight line passing through the first point and the second point.

If the X coordinate of the second point is smaller than the X coordinate of the first point and if the Y coordinate of the third point is larger than the Y coordinate on the extended line of the first point and the second point (the Y coordinate of the point that is on the extended line and correspond to the third point of the X coordinate), the gesture control unit 123 determines that the rotating operation is counterclockwise (Pattern P1). If the X coordinate of the second point is larger than the X coordinate of the first point and if the Y coordinate of the third point is smaller than the Y coordinate on the extended line of the first point and the second point, the gesture control unit 123 determines that the rotating operation is counterclockwise (Pattern P2).

On the other hand, if the X coordinate of the second point is larger than the X coordinate of the first point and if the Y coordinate of the third point is larger than the Y coordinate on the extended line of the first point and the second point, the gesture control unit 123 determines that the rotating operation is clockwise. Furthermore, if the X coordinate of the second point is smaller than the X coordinate of the first point and if the Y coordinate of the third point is smaller than the Y coordinate on the extended line of the first point and the second point, the gesture control unit 123 determines that the rotating operation is clockwise.

The gesture control unit 123 may calculate the rotation angle based on the distance between the second point and the third point. The distance may be calculated by the Pythagorean theorem based on the difference ($\Delta X$) between the X coordinates of the second point and the third point and on the difference ($\Delta Y$) between the Y coordinates of the second point and the third point. Moreover, the distance may simply be defined as $\Delta X + \Delta Y$. The gesture control unit 123 converts the drag distance to the rotation angel of the scroll wheel by multiplying the drag distance by a specific coefficient. The gesture control unit 123 may determine the coordinates of the rotation center based on a plurality of points and may directly calculate the rotation angel for the touch operation. That is, one rotation of the trajectory of the touch operation may correspond to one rotation of the scroll wheel or may not correspond to one rotation of the scroll wheel. For example, one rotation of the trajectory of the touch operation may correspond to a plurality of rotations of the scroll wheel.

Figure 7:
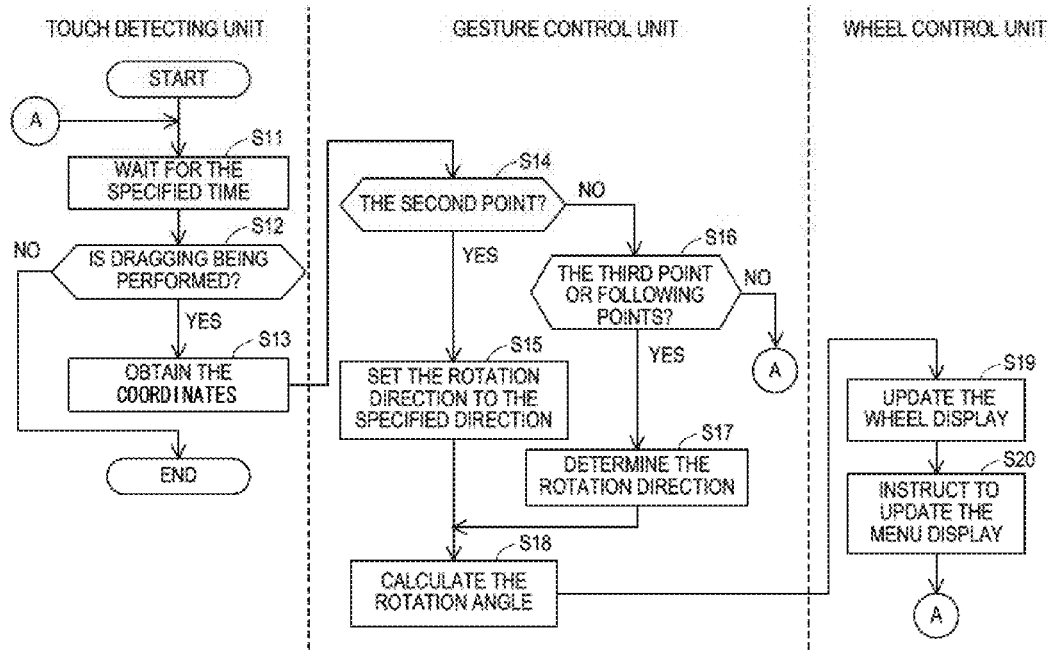
FIG. 7 is a flowchart illustrating display control of a first embodiment.

FIG. 7 is a flowchart illustrating a display control of a first embodiment. The processing of this flowchart is repeatedly performed on the mobile phone 100. The processing illustrated in FIG. 7 will be described below according to the step numbers.

[Step S11]

The touch detecting unit 121 waits for a specified time (for example, 50 ms) to obtain the coordinates of the latest touch position.

[Step S12]

The touch detecting unit 121 determines whether or not an operation for continuously rubbing (drag) the touch panel 106 is performed. The touch detecting unit 121 may determine whether or not the drag is being performed depending on whether or not the UP event is obtained after the DOWN event is obtained. If the drag is being performed, the process goes to step S13. If not, the process is finished.

[Step S13]

The touch detecting unit 121 obtains the coordinates of the latest touch position and notifies the gesture control unit 123 of the coordinates.

[Step S14]

The gesture control unit 123 determines whether or not the coordinates obtained from the touch detecting unit 121 at step S13 are the coordinates of the second point from the start of the drag. If the coordinates are the coordinates of the second point, the process goes to step S15. If not, the process goes to step S16.

[Step S15]

The gesture control unit 123 sets the rotation direction of the scroll wheel to a prescribed direction (for example, a clockwise direction). This is because the rotation direction is difficult to be determined properly with only two coordinates. Then the process goes to step S18.

[Step S16]

The gesture control unit 123 determines whether or not the coordinates obtained from the touch detecting unit 121 at step S13 are the coordinates of the third point or following points from the start of drag. If the coordinates are the coordinates of the third point or following points, the process goes to step S17. If not (if the coordinates are the first coordinates), the process goes to step S11 and waits for the next coordinate.

[Step S17]

The gesture control unit 123 determines the rotation direction based on the stored past two coordinates and the latest coordinates obtained in step S13. The rotation direction is determined by, for example, the method illustrated in FIG. 6. The gesture control unit 123 sets the rotation direction of the scroll wheel.

[Step S18]

The gesture control unit 123 calculates the rotation angle based on the coordinates of the stored previous point and the latest coordinates obtained in step S13. That is, the gesture control unit 123 converts the drag distance to a rotation angle. Then the gesture control unit 123 notifies the wheel control unit 124 of the calculated rotation angle and the rotation direction that is set in step S15 or determined in step S17.

[Step S19]

The wheel control unit 124 changes the image of the scroll wheel displayed on the display 107 to an image corresponding to the rotation direction and the rotation angle notified from the gesture control unit 123 in step S18.

[Step S20]

The wheel control unit 124 notifies the menu control unit 125 of the rotation direction and the rotation angle obtained from the gesture control unit 123 in step S18. The menu control unit 125 changes the selected item to an item corresponding to the rotation direction and the rotation angle.

In this manner, when the user is performing the dragging operation on the touch panel 106, the touch detecting unit 121 continuously reports the coordinates of the touch position. Based on the series of the coordinates of the touch position, the gesture control unit 123 determines the rotation direction and calculates the rotation angle of the case of being replaced by the rotating operation of the scroll wheel 105a. The wheel control unit 124 displays the image of the scroll wheel, rotated in this direction and by this angle, on the display 107. The menu control unit 125 performs menu control corresponding to when the above-described rotating operation is performed on the scroll wheel 105a.

Figure 8:
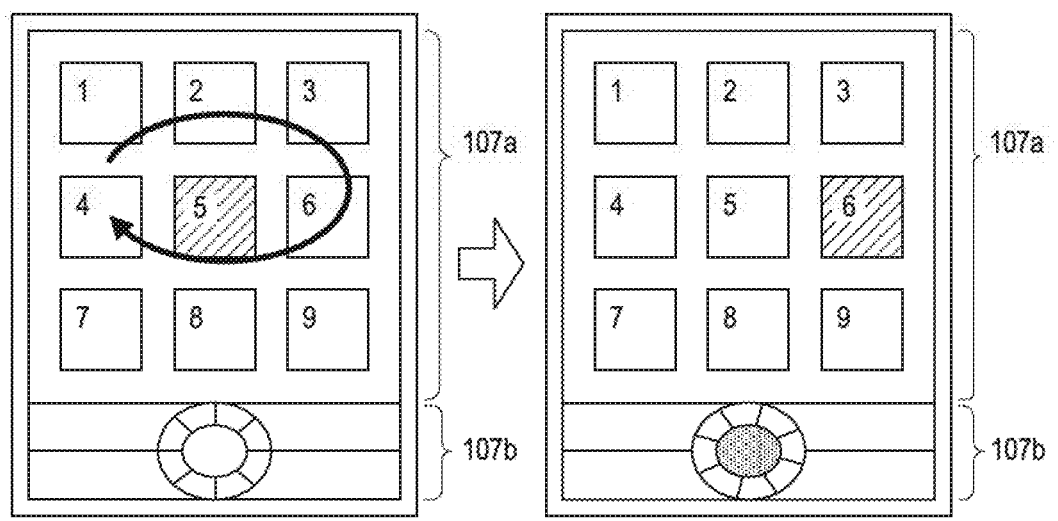
FIG. 8 is a diagram illustrating a screen display example of the first embodiment.

FIG. 8 is a diagram illustrating a screen display example of a first embodiment. The screen illustrated in FIG. 8 is displayed on the display 107 under control of the operation screen control unit 122. At this time, the display area 107a is an area in which a menu is displayed (the first display area). In the example of FIG. 8, nine items are displayed in a grid shape in the display area 107a. Those items may be displayed in a list. A display area 107b is an area in which the image of the scroll wheel is displayed (the second display area). In the display area 107b, images of a button and the like may be combined to be displayed for other operations.

In this case, the fifth item of the menu is currently selected, for example. In this state, for example, the user performs the touch operation for drawing a circular arc in the clockwise direction on the display area 107a. Then a scroll wheel rotated in the clockwise direction is displayed in the display area 107b. This enables the user to confirm that the touch operation on the display area 107a is recognized as a rotating operation on the scroll wheel.

The change of the selected item corresponding to the above-described wheeling operation is reflected to the display area 107a. For example, if the clockwise direction corresponds to the ascending order, the selected position is moved from the fifth item to the sixth item. If the drag distance is long, the selected position is sequentially moved in the order of 6, 7, 8, 9, 1, 2, 3, 4 etc. However, the moving order of the selected position may be variously changed. For example, the selected position may be moved in the longitudinal direction.

In this manner, to move the selected item of the menu, the user may perform the touch operation on the image of the scroll wheel and also may perform the touch operation on other display areas. Furthermore, when the scroll wheel 105a of the housing 102 is exposed, the user may operate the scroll wheel 105a. Either operation may achieve the same performance. At this time, the image of the scroll wheel may be displayed only when the scroll wheel 105a is exposed.

Figure 9:
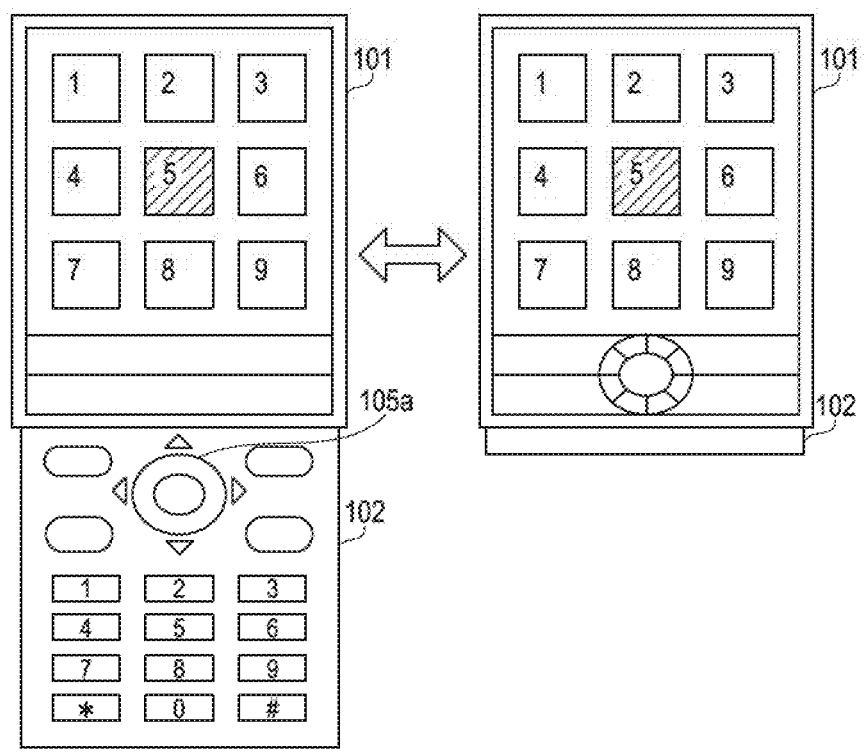
FIG. 9 is a diagram illustrating another screen display example of the first embodiment.

FIG. 9 is a diagram illustrating another screen display example of the first embodiment. As illustrated in FIG. 9, when the housing 102 is slid in relation to the housing 101 and the scroll wheel 105a is exposed, the image of the scroll wheel is not displayed on the display 170. On the other hand, when the scroll wheel 105a is not exposed, the image of the scroll wheel is displayed on the display 107.

When the image of the scroll wheel is not displayed, the touch operation for drawing a circular arc may be responsive or may not be responsive. When the touch operation for drawing a circular arc is performed, the image of the scroll wheel may be displayed only for a specified time. When the image of the scroll wheel is not displayed, the menu item may be displayed in the area in which the image of the scroll wheel is typically displayed.

The use of the above-described mobile phone 100 enables the user to perform the touch operation more comfortably. If the touch operation for drawing a circular arc in the area outside the image of the scroll wheel is performed, the touch operation is substantially recognized as an operation performed on the scroll wheel. Accordingly, burden of the touch operation is reduced, and operation errors are reduced. Since the image of the scroll wheel is rotated by the touch operation in the area outside the image of the scroll wheel, the user may intuitively confirm that the touch operation is normally recognized.

Second Embodiment

Next, a second embodiment will be described in detail with reference to the diagrams. The difference from the above-described first embodiment will be mainly described. Description of the same matter will be omitted. In the second embodiment, the image of the cross key is displayed on the display and is responsive to the touch operation for drawing a straight line.

The mobile phone according to the second embodiment is achieved by the same hardware as in the first embodiment illustrated in FIG. 2 to FIG. 4. Direction detection may be performed by using the scroll wheel 105a. A cross key may be provided instead of the scroll wheel 105a. The mobile phone according to the second embodiment achieves the same function as in the first embodiment illustrated in FIG. 5 by performing a specified program. In the second embodiment, a direction key control unit 124a, which controls the image of the cross key displayed on the display 107, is provided instead of the wheel control unit 124.

Figure 10:
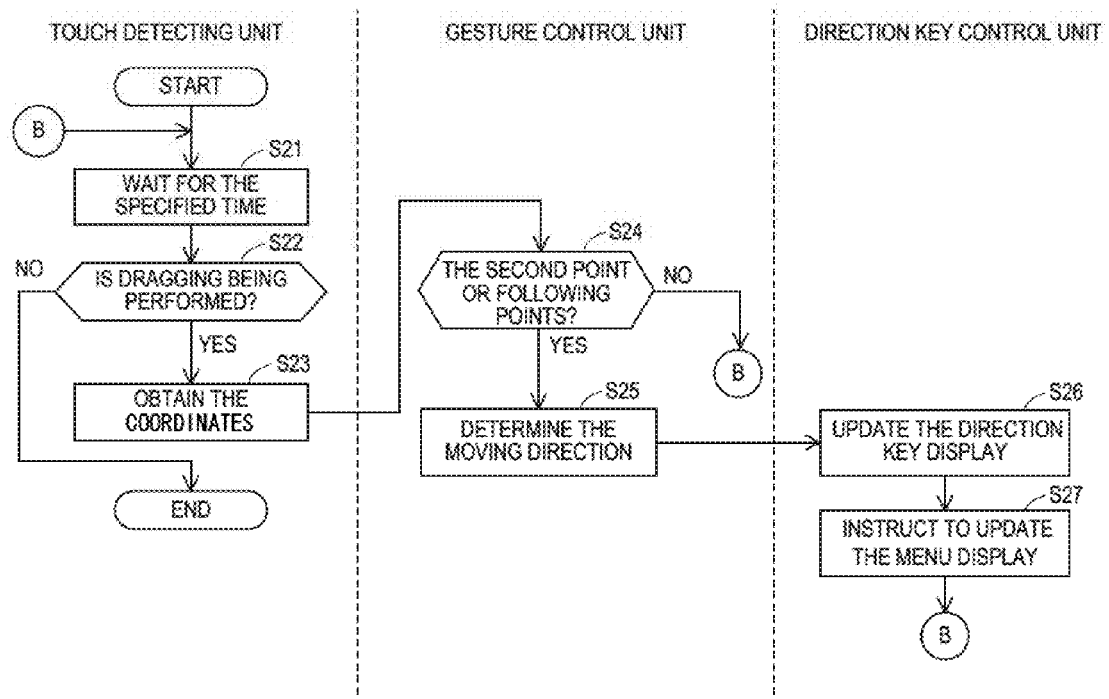
FIG. 10 is a flowchart illustrating display control of a second embodiment.

As for a module that is the same as in the first embodiment, the second embodiment will be described by using the same numerals as in the first embodiment. FIG. 10 is a flowchart illustrating a display control of the second embodiment. The processing of this flowchart is repeatedly performed on the mobile phone 100. The processing illustrated in FIG. 10 will be described below according to the step numbers.

[Step S21]

The touch detecting unit 121 waits for a specified time (for example, 50 ms) to obtain the coordinates of the latest touch position.

[Step S22]

The touch detecting unit 121 determines whether or not the operation (drag) for continuously rubbing the touch panel 106 is performed. If the drag is being performed, the process goes to step S23. If not, the process is finished.

[Step S23]

The touch detecting unit 121 obtains the coordinates of the latest touch position and notifies the gesture control unit 123 of the coordinates.

[Step S24]

The gesture control unit 123 determines whether or not the coordinates obtained from the touch detecting unit 121 in step S23 correspond to the coordinates of the second point or following points from the start of the drag. If the coordinates correspond to the second point or following points, the process goes to step S25. If not (if the coordinates correspond to the first coordinates), the process goes to step S21 and waits for the next coordinates.

[Step S25]

The gesture control unit 123 determines the moving direction based on the stored previous coordinates and the latest coordinates obtained in step S23. The moving direction is determined, for example, by upward and downward directions, left and right directions, or upward, downward, left, and right directions according to a display format of the menu. In case of a menu in which items are arranged in a longitudinal direction, the moving direction may be determined by, for example, two directions: upward and downward. The gesture control unit 123 notifies the direction key control unit 124a of the determined direction.

The upward and downward directions may be determined by comparing two points of the Y coordinates. The left and right directions may be determined by comparing two points of the X coordinates. To determine the moving direction of the four directions upward, downward, left, and right, either the upward and downward directions or the left and right directions may be determined by comparing the difference $\Delta X$ of the X coordinates and the difference $\Delta Y$ of the Y coordinates and giving priority to the larger difference.

[Step S26]

The direction key control unit 124a changes the image of the cross key displayed on the display 107 to the image corresponding to the moving direction determined by the gesture control unit 123. For example, the image may be changed to the image indicating that the direction determined from among the four directions is pressed.

[Step S27]

The direction key control unit 124a notifies the menu control unit 125 of the moving direction determined by the gesture control unit 123. The menu control unit 125 changes the selected position of the menu according to the moving direction. For example, if the downward direction is determined, the selected position is moved down one item.

In this manner, when the user is performing the dragging operation on the touch panel 106, the touch detecting unit 121 continuously reports the coordinates of the touch position. The gesture control unit 123 determines the moving direction based on the series of the coordinates of the touch position. The direction key control unit 124a displays, on the display 107, the image of the cross key pressed in the determined direction. The menu control unit 125 performs the menu control corresponding to the case where the above-described key operation is performed.

Figure 11:
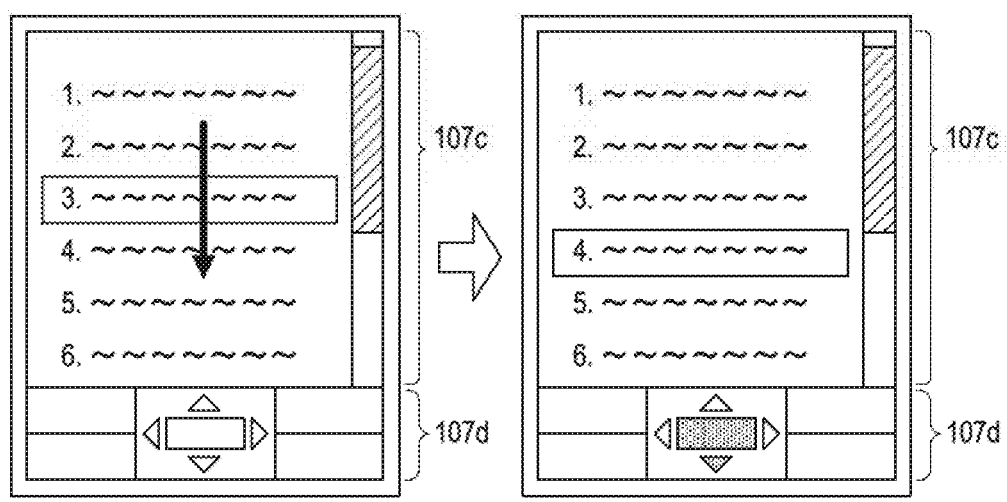
FIG. 11 is a diagram illustrating a screen display example of the second embodiment.

FIG. 11 is a diagram illustrating a screen display example of the second embodiment. The screen illustrated in FIG. 11 is displayed on the display 107 under control of the operation screen control unit 122. In this case, a display area 107c is an area (the first display area) in which the menu is displayed. In the example of FIG. 11, six items are displayed in a list in the longitudinal direction in the display area 107c. These items may be displayed in a transverse direction or in a grid shape. The display area 107d is an area (the second display area) in which the image of the cross key is displayed. In a display area 107d, images of a button and the like for other operations may be combined to be displayed.

At this time, for example, the third item of the menu is currently selected. In this state, for example, the user performs the touch operation for drawing a straight line from top to bottom on the display area 107c. Then the image of the cross key pressed in the downward direction is displayed in the display area 107d. This enables the user to confirm that the touch operation on the display area 107c is recognized as a pressing operation of the cross key. The change of the selected item according to the above-described pressing operation is reflected to the menu in the display area 107c. For example, the selected position is moved from the third item to the fourth item. The selected position may be moved only by one item by one drag and may also be moved by a plurality of items according to the drag distance.

In this manner, to move between the selected items of the menu, the user may perform the touch operation for pressing any direction on the image of the cross key, and may perform the touch operation for drawing a straight line on other display areas. Furthermore, when the cross key (or other types of input devices such as a scroll wheel) provided on the housing 102 is exposed, the user may operate the cross key. Also, the image of the cross key may be displayed in the display area 107d only when the cross key provided on the housing 102 is exposed.

The use of the above-described mobile phone 100 enables the user to perform the touch operation more comfortably. Even though the touch operation for drawing a straight line in the area outside the image of the cross key is performed, the touch operation is substantially recognized as an operation on the cross key. Therefore, burden of the touch operation is reduced, and operation errors are reduced. Furthermore, since the image of the cross key responds to the touch operation performed in the area outside the image of the cross key, the user may intuitively confirm that the touch operation is normally recognized.

Third Embodiment

Next, a third embodiment will be described in detail with reference to the diagrams. The difference between the above-described first embodiment and second embodiment will be mainly described. The description of the same matter is omitted.

In the third embodiment, the image of a slider bar is displayed on the display and is responsive to the touch operation for drawing a straight line.

The mobile phone according to the third embodiment is achieved by the same hardware as in the first embodiment illustrated in FIG. 2 to FIG. 4. The mobile phone may perform slide detection by using the scroll wheel or the cross key and may be provided with other types of input devices such as a jog dial. Furthermore, in the mobile phone according to the third embodiment, the same functions as in the first embodiment illustrated in FIG. 5 are achieved by performing a specified program. In the third embodiment, the mobile phone is provided with a slider bar control unit 124b instead of the wheel control unit 124 to control the image of the slider bar displayed on the display 107.

Figure 12:
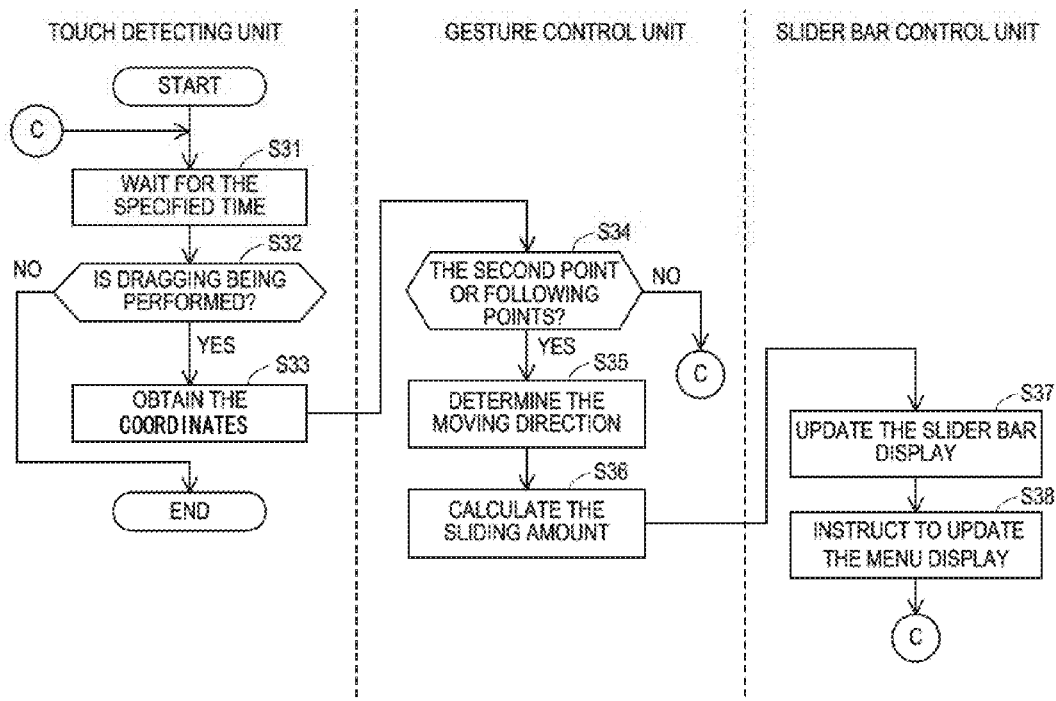
FIG. 12 is a flowchart illustrating display control of a third embodiment.

As for the same module as in the first embodiment, the third embodiment will be described below by using the same numerals as in the first embodiment. FIG. 12 is a flowchart illustrating display control of the third embodiment. The processing of this flowchart is repeatedly performed on the mobile phone 100. The processing illustrated in FIG. 12 will be described below according to the step numbers.

[Step S31]

The touch detecting unit 121 waits for the specified time (for example, 50 ms) to obtain the coordinates of the latest touch position.

[Step S32]

The touch detecting unit 121 determines whether or not the operation for continuously rubbing (drag) the touch panel 106 is performed. If the drag is being performed, the process goes to step S33. If not, the process is finished.

[Step S33]

The touch detecting unit 121 obtains the coordinates of the latest touch position and notifies the gesture control unit 123 of the coordinates.

[Step S34]

The gesture control unit 123 determines whether or not the coordinates obtained from the touch detecting unit 121 in step S33 are the coordinates of the second point or following points from the start of the drag. If the obtained coordinates are the coordinates of the second point or following points, the process goes to step S35. If not (if the obtained coordinates are the first coordinates), the process goes to step S31 and waits for the next coordinates.

[Step S35]

The gesture control unit 123 determines the moving direction based on the stored previous coordinates and the latest coordinates obtained in step S33. The moving direction is determined by upward and downward directions, left and right directions, or the like according to the display format of the slider bar. For example, if the slider bar is slidable in the longitudinal direction, the moving direction is determined by upward and downward directions. If the slider bar is slidable in the transverse direction, the moving direction is determined by left and right directions. Then the gesture control unit 123 notifies the slider bar control unit 124b of the determined direction.

The upward and downward directions may be determined by comparing two points of the Y coordinates. The left and right directions may be determined by comparing two points of the X coordinates. If the mobile phone has both the slider bar that is slidable in the longitudinal direction and the slider bar that is slidable in the transverse direction, the upward and downward directions and the left and right directions may be determined separately.

[Step S36]

The gesture control unit 123 calculates the sliding amount based on the stored previous coordinates and the latest coordinates obtained in step S33. That is, the drag distance is converted to the sliding amount of the slider bar. Then the gesture control unit 123 notifies the slider bar control unit 124b of the calculated sliding amount and the moving direction determined in step S35.

The drag distance may be calculated by the Pythagorean theorem based on the difference of the X coordinates ($\Delta X$) between the latest point and the previous point and the difference of the Y coordinates ($\Delta Y$) between the latest point the previous point. The drag distance may be defined simply as $\Delta X+\Delta Y$. For example, the gesture control unit 123 may convert the drag distance to the sliding amount of the slider bar by multiplying the drag distance by specified coefficients.

[Step S37]

The slider bar control unit 124b changes the image of the slider bar displayed on the display 107 to the image corresponding to the moving direction and the sliding amount obtained from the gesture control unit 123.

[Step S38]

The slider bar control unit 124b notifies the menu control unit 125 of the moving direction and the sliding amount obtained from the gesture control unit 123. The menu control unit 125 scrolls the menu according to the moving direction and the sliding amount. For example, if the gesture control unit 123 determines that the moving direction is downward, the menu is scrolled in the downward direction.

In this manner, when the user is performing the dragging operation on the touch panel 106, the touch detecting unit 121 continuously reports the coordinates of the touch position. Based on the series of the coordinates of the touch position, the gesture control unit 123 determines the moving direction and calculates the sliding amount of a case where the dragging operation is replaced by the sliding operation of the slider bar. The slider bar control unit 124b displays the image of the slider bar that is moved in the determined direction and only by the calculated amount on the display 107. The menu control unit 125 performs the menu control corresponding to the performance of the above-described sliding operation.

Figure 13:
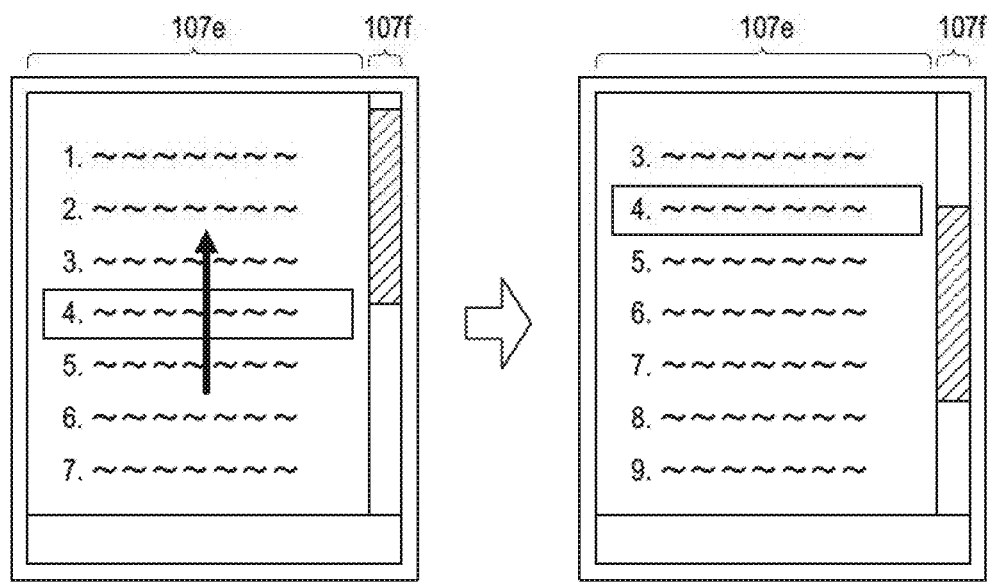
FIG. 13 is a diagram illustrating a screen display example of the third embodiment.

FIG. 13 is a diagram illustrating a screen display example of the third embodiment. The screen illustrated in FIG. 13 is displayed on the display 107 under control of the operation screen control unit 122. In this case, a display area 107e is an area (the first display area) in which the menu is displayed. In the example of FIG. 13, seven items may be displayed in a list in the longitudinal direction in the display area 107e. However, since there are more than seven items, all the items may not be displayed all at once. A display area 107f is an area (the second display area) in which the image of the slider bar is displayed. The image of the slider bar may also be provided in the transverse direction.

At this time, for example, the fourth item of the menu is currently selected. In this state, for example, the user performs the touch operation for drawing a straight line from top to bottom on the display area 107e. Then the image of the slider bar that is slid in the downward direction is displayed in the display area 107f. This enables the user to confirm that the touch operation is recognized as a sliding operation on the display area 107e. Furthermore, as for the menu of the display area 107e, the screen is scrolled according to the above-described sliding operation. For example, while the selected position remains at the fourth item, the whole menu is scrolled in the downward direction. In the example of FIG. 13, although the menu is scrolled in the downward direction by the dragging operation from bottom to top, the response direction may be reversed.

As described above, to scroll the menu, the user may perform the dragging operation on the image of the slider bar or may perform the touch operation for drawing a straight line on other display areas. Furthermore, when an input device, such as a cross key and a scroll wheel provided on the housing 102, is exposed, the user may operate the input device. The drag amount for the touch operation may correspond to pressing time of the input device. Only when the input device provided on the housing 102 is exposed, the image of the slider bar may be displayed in the display area 107f.

The use of the above-described mobile phone 100 enables the user to perform the touch operation more comfortably. Even though the touch operation for drawing a straight line is performed in the image outside the image of the slider bar, the touch operation is substantially recognized as an operation performed on the slider bar. The burden of the touch operation is reduced, and operation errors are reduced. The image of the slider bar responds to the touch operation performed in the area outside the image of the slider bar. Therefore, the user may intuitively confirm that the touch operation is normally recognized.

The display control according to the above-described first, second, and third embodiments may be combined. In such a case, a type (a circular arc, a straight line, or the like) of the touch operation to be detected may be switched according to the display status of the image on the display 107 and the display format of the menu.

As described above, the display control according to the first, second, and third embodiments may be achieved by making a computer execute a specified program. In this case, the program describing the processing content to be achieved is provided. The program describing the processing content may be stored in a computer-readable recording medium. A computer-readable recording medium may be a magnetic recording device, an optic disk, an optic magnetic recording medium, a semiconductor memory, or the like. The magnetic recording device may be a hard disk device (HDD), a flexible disk (FD), a magnetic tape (MT), or the like. The optic disk may be a Digital Versatile Disc (DVD), a DVD-RAM, a Compact Disc-Read Only Memory (CD-ROM), a Compact Disc-Recordable (CR-R)/Re-Writable (RW), or the like. The optic magnetic recording medium may be a Magneto-Optical disk (MO) or the like.

To distribute a program, for example, a portable recording medium, such as a DVD and a CD-ROM in which the program is recorded, is sold. Furthermore, the program may be stored in a storage device of a server computer, and then may be transferred to another computer from the server computer through a network.

The computer that executes a program stores, for example, the program recorded in a portable recording medium or the program transferred from the server computer in the storage device therein. Then the computer reads the program from the storage device therein and executes processing according to the program. The computer may read out the program directly from the portable recording medium and may execute processing according to the program. The computer may sequentially execute processing according to the received program every time when the program is transferred from the server computer.

According to the above-described mobile terminal device and display control method the operability of the touch operation is improved.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A mobile terminal device comprising:
    a display unit that includes a display area in which an image indicating a scroll wheel is displayed;
    a detecting unit that detects a touch operation performed on the display unit;
    a control unit that changes the image indicating the scroll wheel displayed on the display unit according to a trajectory of the touch operation detected by the detecting unit;
    a first housing that includes the display unit; and a second housing that includes a physical scroll wheel that is movable in relation to the first housing and that is exposed when the second housing is moved; wherein the image indicating the scroll wheel corresponds to the physical scroll wheel included in the second housing,
    wherein the display unit displays the image indicating the scroll wheel when the physical scroll wheel is not exposed and displays other information without displaying the image indicating the scroll wheel when the physical scroll wheel is exposed; and
    wherein the image indicating the scroll wheel is used to navigate in place of the physical scroll wheel that is not exposed.

2. The device according to claim 1, wherein the image indicating the scroll wheel is displayed in a first display area included in the display unit; and
    wherein the detecting unit detects the touch operation performed on a second display area which is included in the display unit and different from the first display area.

3. The device according to claim 1,
    wherein the control unit calculates a rotation angle based on the trajectory of the touch operation and changes the image of the scroll wheel according to the rotation angle.

4. A display control method of a mobile terminal device that includes a display unit, a first housing that includes the display unit, and a second housing that includes a physical scroll wheel that is movable in relation to the first housing and that is exposed when the second housing is moved, the display control method comprising:
    displaying an image indicating a scroll wheel in a display area of the display unit;
    detecting a touch operation performed on the display unit; and
    changing the image indicating the scroll wheel displayed in the display unit according to a trajectory of the detected touch operation; wherein
    the image indicating the scroll wheel corresponds to the physical scroll wheel included in the second housing,
    the displaying displays the image indicating the scroll wheel when the physical scroll wheel is not exposed, and the displaying displays other information without displaying the image indicating the scroll wheel when the physical scroll wheel is exposed; and
    wherein the image indicating the scroll wheel is used to navigate in place of the physical scroll wheel that is not exposed.

5. A non-transitory computer-readable recording medium storing a program, the program causing a computer which includes a display unit, a first housing that includes the display unit, and a second housing that includes a physical scroll wheel that is movable in relation to the first housing and that is exposed when the second housing is moved, to execute:
- displaying an image indicating the scroll wheel in a display area of the display unit;
- detecting a touch operation performed on the display unit; and
- changing the image indicating the scroll wheel displayed in the display unit according to a trajectory of the detected touch operation; wherein
- the image indicating the scroll wheel corresponds to the physical scroll wheel included in the second housing,
- the displaying displays the image indicating the scroll wheel when the physical scroll wheel is not exposed, and the displaying displays other information without displaying the image indicating the scroll wheel when the physical scroll wheel is exposed; and
- wherein the image indicating the scroll wheel is used to navigate in place of the physical scroll wheel that is not exposed.

* * * * *